(12) United States Patent
Dolman et al.

(10) Patent No.: US 6,272,356 B1
(45) Date of Patent: Aug. 7, 2001

(54) MECHANICAL SPRING ANTENNA AND RADIOTELEPHONES INCORPORATING SAME

(75) Inventors: Rodney A. Dolman, Cary; Russell Evans Winstead, Raleigh; Gerard J. Hayes, Wake Forest, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/309,017

(22) Filed: May 10, 1999

(51) Int. Cl.[7] ........................................... H04B 1/38
(52) U.S. Cl. .................. 455/550; 455/90; 455/575; 343/702
(58) Field of Search .................................. 455/550, 575, 455/90; 343/702; 379/428, 433

(56) References Cited

U.S. PATENT DOCUMENTS

| | | | | |
|---|---|---|---|---|
| 5,170,173 | * | 12/1992 | Krenz et al. | 343/702 |
| 5,508,709 | * | 4/1996 | Krenz et al. | 343/702 |
| 5,706,332 | * | 1/1998 | Nagai | 455/90 |
| 5,943,021 | * | 8/1999 | Hayes et al. | 343/702 |
| 6,208,874 | * | 3/2001 | Rudisill et al. | 455/550 |

* cited by examiner

*Primary Examiner*—William Trost
*Assistant Examiner*—Rafael Perez-Gutierrez
(74) *Attorney, Agent, or Firm*—Myers Bigel Sibley & Sajovec (57) ABSTRACT

A spring member internally mounted within an electronic device, such as a radiotelephone, serves both as a mechanical device for urging a flip cover to an open position and as an antenna for receiving and/or transmitting wireless communications signals.

56 Claims, 9 Drawing Sheets

MECHANICAL SPRING ANTENNA AND RADIOTELEPHONES INCORPORATING SAME

FIELD OF THE INVENTION

The present invention relates generally to radiotelephones and, more particularly, to radiotelephone antennas.

BACKGROUND OF THE INVENTION

Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems.

Handheld radiotelephones (e.g., cellular telephones), may have an appendage, such as a flip cover, pivotally mounted to the housing thereof that is movable between closed and open positions. A flip cover for a radiotelephone may contain a microphone, speaker, antenna or other electronic components. To facilitate one-handed operation, some radiotelephones utilize a spring-activated flip cover that is held in a closed position by a mechanical latching mechanism.

Figures 1, 2:
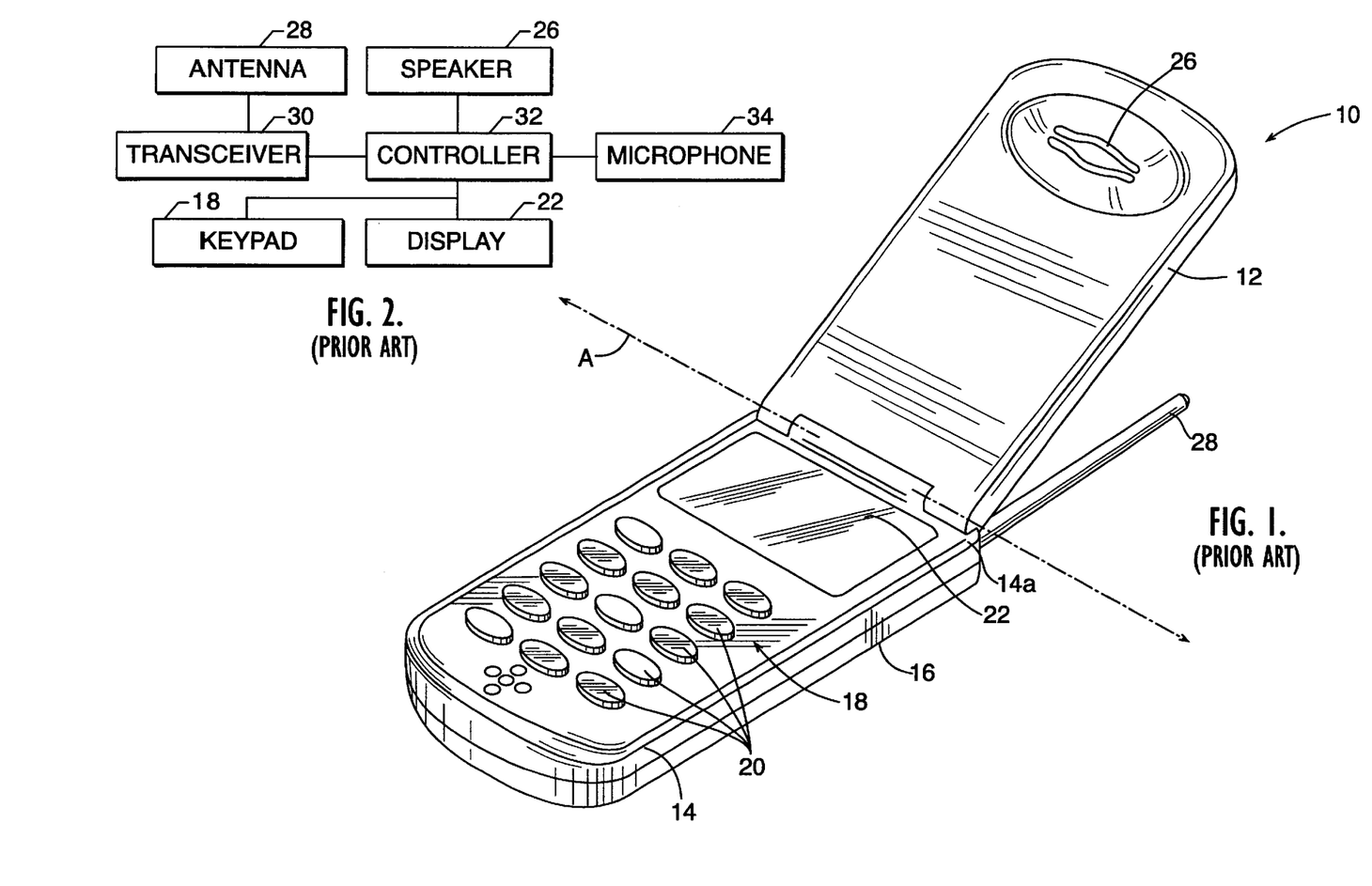
FIG. 1 illustrates an exemplary radiotelephone having a "top-hinged" flip cover.
FIG. 2 is a schematic illustration of a conventional arrangement of electronic components for enabling a radiotelephone to transmit and receive telecommunications signals.

FIG. 1 illustrates a radiotelephone 10 with a "top-hinged" flip cover 12. The illustrated radiotelephone 10 includes a top handset housing 14 and a bottom handset housing 16 connected thereto to form a cavity therein. Top and bottom handset housings 14 and 16 house a keypad 18 including a plurality of keys 20, a display 22, and electronic components (not shown) that enable the radiotelephone 10 to transmit and receive telecommunications signals. A flip cover 12 is hinged to the top end 14a of the top housing 14, and is configured to house a speaker 26. An antenna 28 extends from the radiotelephone 10 as illustrated.

In operation, the flip cover 12 may be pivoted by a user about an axis A between an open position and a closed position. When in a closed position, the flip cover 12 may provide protection to the keypad 18 from unintentional activation or exposure to the elements. When in an open position, the speaker 26 within the flip cover 12 may be favorably positioned to provide audio output to a user.

Conventionally, a radiotelephone antenna is electrically connected to radio frequency circuitry (i.e., a transceiver) located within the radiotelephone housing. The antenna and the radio frequency circuitry are typically interconnected such that the impedance of the antenna and the impedance of the radio frequency circuitry are substantially matched.

Radiotelephones and other electronic devices are undergoing miniaturization. Indeed, many of the contemporary radiotelephone models are less than 11–12 centimeters in length. For aesthetic reasons, it may be desirable to eliminate antennas that extend outwardly from radiotelephones. Unfortunately, antennas incorporated entirely within a radiotelephone may not be able to achieve adequate radiation performance.

A radiotelephone antenna may be incorporated within a flip cover. Unfortunately, matching the impedance of an antenna housed within a flip cover of a radiotelephone may be difficult because the antenna impedance may be dependent on the position of the flip cover with respect to both the housing of the radiotelephone and the printed circuit board which contains the radio frequency circuitry. As these respective positions change as a flip cover is moved between stored and operating positions, an antenna conventionally exhibits at least two different impedance states, both of which should be matched to the impedance of the feed from the printed circuit board.

Accordingly, with a radiotelephone flip cover incorporating an antenna, it is generally desirable to provide an impedance matching system that can provide an acceptable impedance match between the antenna and the radio frequency circuitry, both when the flip cover is in a stored position, and when the flip cover is in an operating position. Unfortunately, incorporating impedance matching components and/or circuitry within a radiotelephone may be somewhat expensive. Furthermore, available space within radiotelephones may be somewhat limited.

SUMMARY OF THE INVENTION

It is, therefore, an object of the present invention to provide radiotelephone antennas that can achieve adequate radiation performance when incorporated within a radiotelephone housing.

It is another object of the present invention to provide radiotelephone antennas that can be incorporated within a radiotelephone housing without requiring impedance matching components and/or circuitry.

It is another object of the present invention to facilitate reducing the costs associated with radiotelephone manufacturing.

It is yet another object of the present invention to facilitate efforts to miniaturize radiotelephones and other electronic devices.

These and other objects of the present invention are provided by a spring member internally mounted within an electronic device, such as a radiotelephone, that serves both as a mechanical device and as an antenna for receiving and/or transmitting wireless communications signals. For example, a radiotelephone may include a housing and a flip cover rotatably secured to the housing via a hinge. A spring member disposed within the hinge may serve to urge the flip cover along a predetermined path of rotation from a closed position adjacent the housing to an open position extending away from the housing. The spring member is electrically conductive and is also in electrical communication with a transceiver enclosed within the radiotelephone housing. The spring member is configured to receive and transmit radiotelephone communication signals.

According to an embodiment of the present invention, a spring member may have a helical configuration that can torsionally deflect as the flip cover is moved from a closed position to an open position. The torsional deflection of the spring member is such that an impedance of the spring member can match an impedance of a transceiver when the flip cover is in both the closed and operating positions. As a result, impedance matching components and/or circuitry may not be required.

Various alternative embodiments of the present invention are provided for obtaining multiple frequency band operation of an internal mechanical spring member. For example, the pitch between adjacent coils of a helical spring member can be varied to induce multiple frequency band operation. In addition, multiple helical spring members may be utilized to induce multiple frequency band operation, wherein each spring member is configured to operate within a respective frequency band.

Furthermore, parasitic radiating elements may be used in conjunction with an internal spring member according to the present invention. For example, a conductive element may be disposed within a flip cover hinge and maintained in adjacent, spaced-apart relationship with an electrically conductive spring member according to the present invention. Accordingly, the conductive element can parasitically couple with the electrically conductive spring member such that the spring member and conductive element can operate within respective frequency bands.

According to another embodiment of the present invention, an internal spring member utilized to urge an antenna pivotally mounted to an electronic device to an operating position may also serve as an antenna for receiving and/or transmitting wireless communication signals. An electrically conductive internal spring member, according to the present invention, is in electrical communication with an antenna pivotally mounted to an electronic device, such as a radiotelephone. The electrically conductive internal spring member is also in electrical communication with a receiver/transceiver within the electronic device. An internal spring member according to the present invention may be directly connected with an antenna, or capacitively coupled with the antenna.

According to the present invention, a pivotally mounted antenna is preferably electrically disconnected from a receiver/transceiver when the antenna is in a stored position. Accordingly, the spring member may operate as a quarter-wave (or multiples thereof) antenna when the pivotally mounted antenna is in a stored position. A spring member according to the present invention and a pivotally mounted antenna preferably operate together as a half-wave (or multiples thereof) antenna when the antenna is in an operating position. An electrically conductive spring member according to the present invention may also be utilized with a stationary or retractable antenna for an electronic device.

The present invention is advantageous because adequate radiation performance can be obtained for an internally mounted radiotelephone antenna without requiring a portion thereof to protrude from the radiotelephone. Furthermore, by transforming an existing mechanical device into an antenna, internal space within a radiotelephone housing can be conserved, thus facilitating miniaturization efforts.

The present invention is also advantageous because the need for impedance matching components and/or circuitry may be eliminated within radiotelephones. Electrically conductive spring members according to the present invention may be configured to torsionally deflect as a flip cover and/or antenna is rotated from a closed position to an open position such that an impedance of the spring member matches an impedance of a transceiver when the flip cover is in both the closed and open operating positions.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A conventional arrangement of electronic components that enable a radiotelephone to transmit and receive telecommunications signals is shown schematically in FIG. 2, and is understood by those skilled in the art of radiotelephone communications. An antenna 28 for receiving and transmitting telecommunication signals is electrically connected to a radio-frequency transceiver 30 that is further electrically connected to a controller 32, such as a microprocessor. The controller 32 is electrically connected to a speaker 26 that transmits a remote signal from the controller 32 to a user of a radiotelephone. The controller 32 is also electrically connected to a microphone 34 that receives a voice signal from a user and transmits the voice signal through the controller 32 and transceiver 30 to a remote device. The controller 32 is electrically connected to a keypad 18 and display 22 that facilitate radiotelephone operation. Other elements of radiotelephones are conventional and need not be described herein.

As is known to those skilled in the art of communications devices, an antenna is a device for transmitting and/or receiving electrical signals. A transmitting antenna typically includes a feed assembly that induces or illuminates an aperture or reflecting surface to radiate an electromagnetic field. A receiving antenna typically includes an aperture or surface focusing an incident radiation field to a collecting feed, producing an electronic signal proportional to the incident radiation. The amount of power radiated from or received by an antenna depends on its aperture area and is described in terms of gain.

Conventional radiotelephones may employ an antenna which is electrically connected to a transceiver operably associated with a signal processing circuit positioned on an internally disposed printed circuit board. In order to maximize power transfer between an antenna and a transceiver, the transceiver and the antenna are preferably interconnected such that their respective impedances are substantially "matched," i.e., electrically tuned to filter out or compensate for undesired antenna impedance components to provide a 50 Ohm (ΩQ) (or desired) impedance value at the circuit feed. Impedance matching systems are well known in the art and need not be discussed further.

Figure 3A:
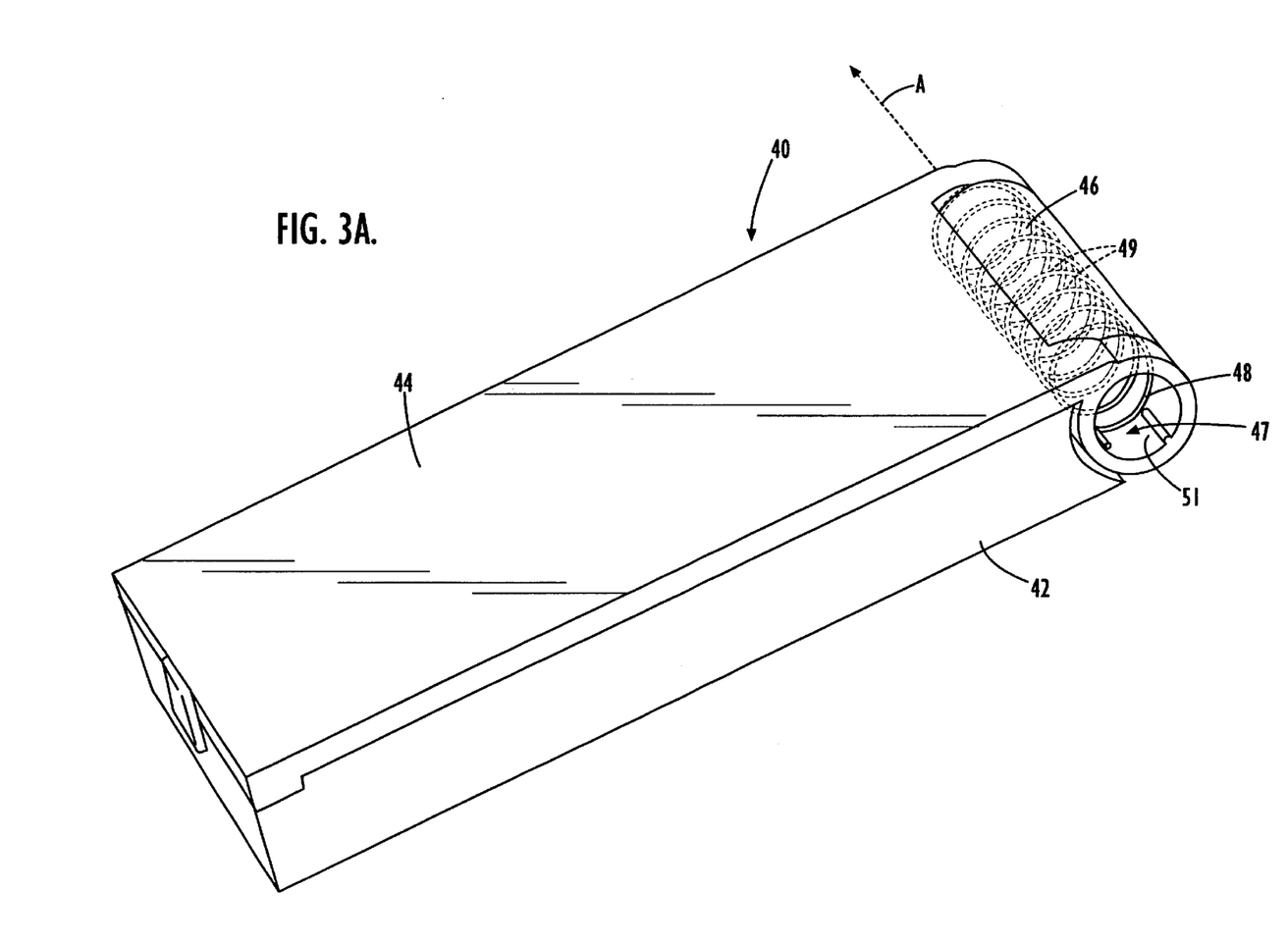
FIG. 3A illustrates a radiotelephone incorporating an electrically conductive internal spring member according to an embodiment of the present invention wherein a flip cover is in a closed position.
Figure 3B:
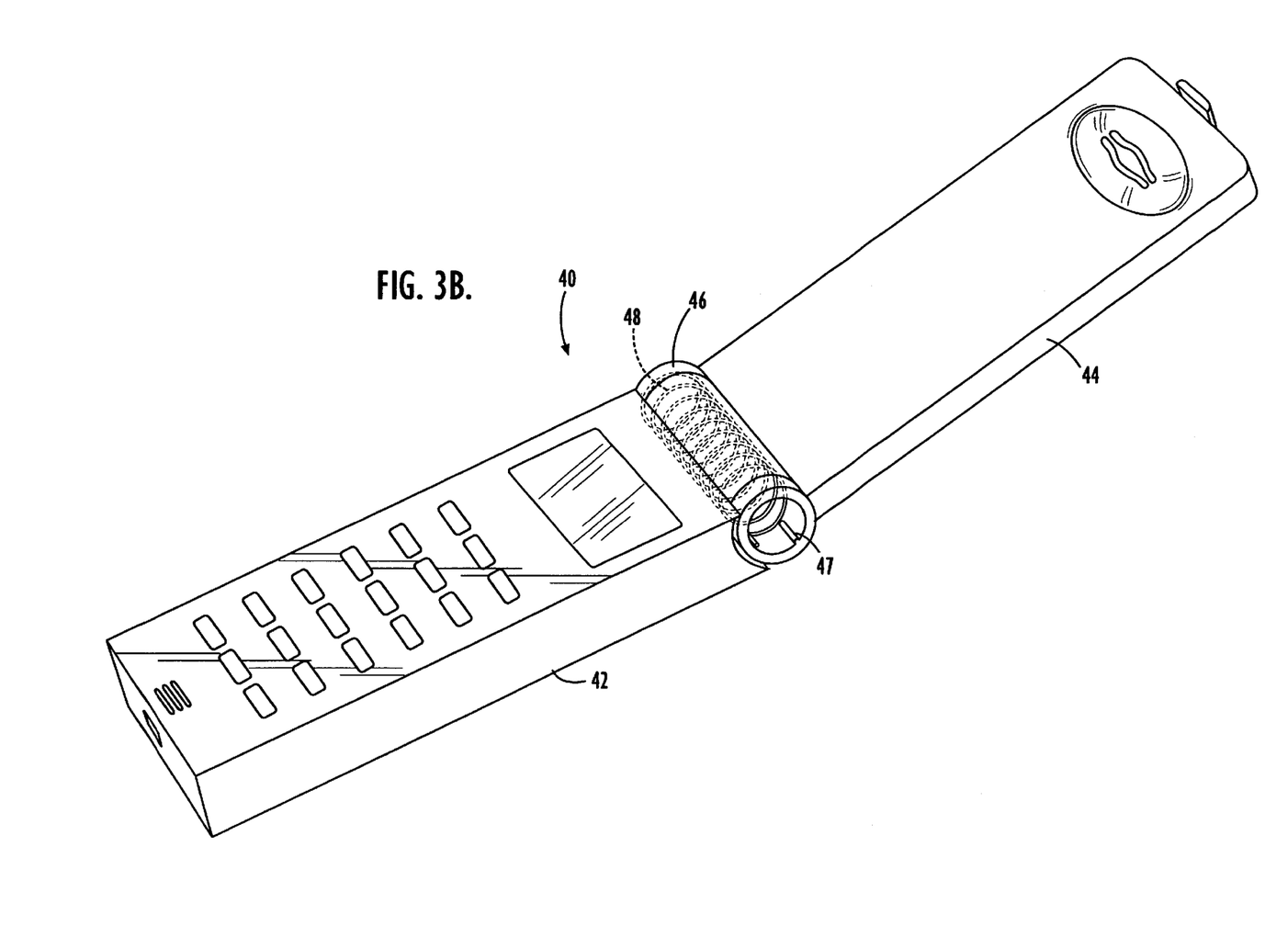
FIG. 3B illustrates the radiotelephone of FIG. 3A wherein the flip cover is in an open position.

Referring now to FIGS. 3A–3B, a radiotelephone 40 incorporating an electrically conductive spring member according to an embodiment of the present invention is illustrated. The illustrated radiotelephone 40 includes a housing 42 that is configured to enclose a transceiver that transmits and receives radiotelephone communications signals. A flip cover 44 is rotatably secured to the housing 42 via a hinge 46 having an internal chamber 47, as illustrated. The flip cover 44 is rotatable about an axis A and along a predetermined path of rotation from a closed position (FIG. 3A) adjacent the housing 42 to an open position (FIG. 3B) extending away from the housing 42.

An electrically conductive spring member 48 that serves as an antenna for the radiotelephone 40 is disposed within the hinge internal chamber 47. Preferably, the hinge 46 is formed from dielectric material selected so as not to significantly attenuate RF fields. Particularly preferable are dielectric materials having a dielectric constant of between about 2.0 and about 5.0. However, it is to be understood that materials having different dielectric constants may be utilized without departing from the spirit and intent of the present invention. Exemplary materials from which the hinge 46 may be formed include polymeric materials, such as fiberglass, Teflon®, polycarbonate, and the like.

The illustrated spring member 48 has a helically coiled configuration that defines an axis that is generally parallel with the illustrated axis A. A helical configuration can be advantageous because the effective electrical length of the spring member 48 as an antenna can be substantially large. As a result, radiation performance can be improved even though the spring member 48 is contained within the housing of the radiotelephone 40.

As a mechanical device, the spring member 48 is configured to exert a biasing force on the flip cover 44 to urge the flip cover 44 to the open position. As an antenna, the spring member 48 is in electrical communication with the transceiver enclosed within the housing 42 and is configured to receive and transmit radiotelephone communication signals. The spring member 48 is configured to deflect under torsion as the flip cover 44 is moved from the closed position (FIG. 3A) to the open position (FIG. 3B), such that an impedance of the spring member 48 matches an impedance of the transceiver when the flip cover 44 is in both the closed and open positions. In addition to physical deflection, physical characteristics of the spring member 48, such as size and diameter of the coils 49, can also be tuning characteristics.

Figures 4, 5:
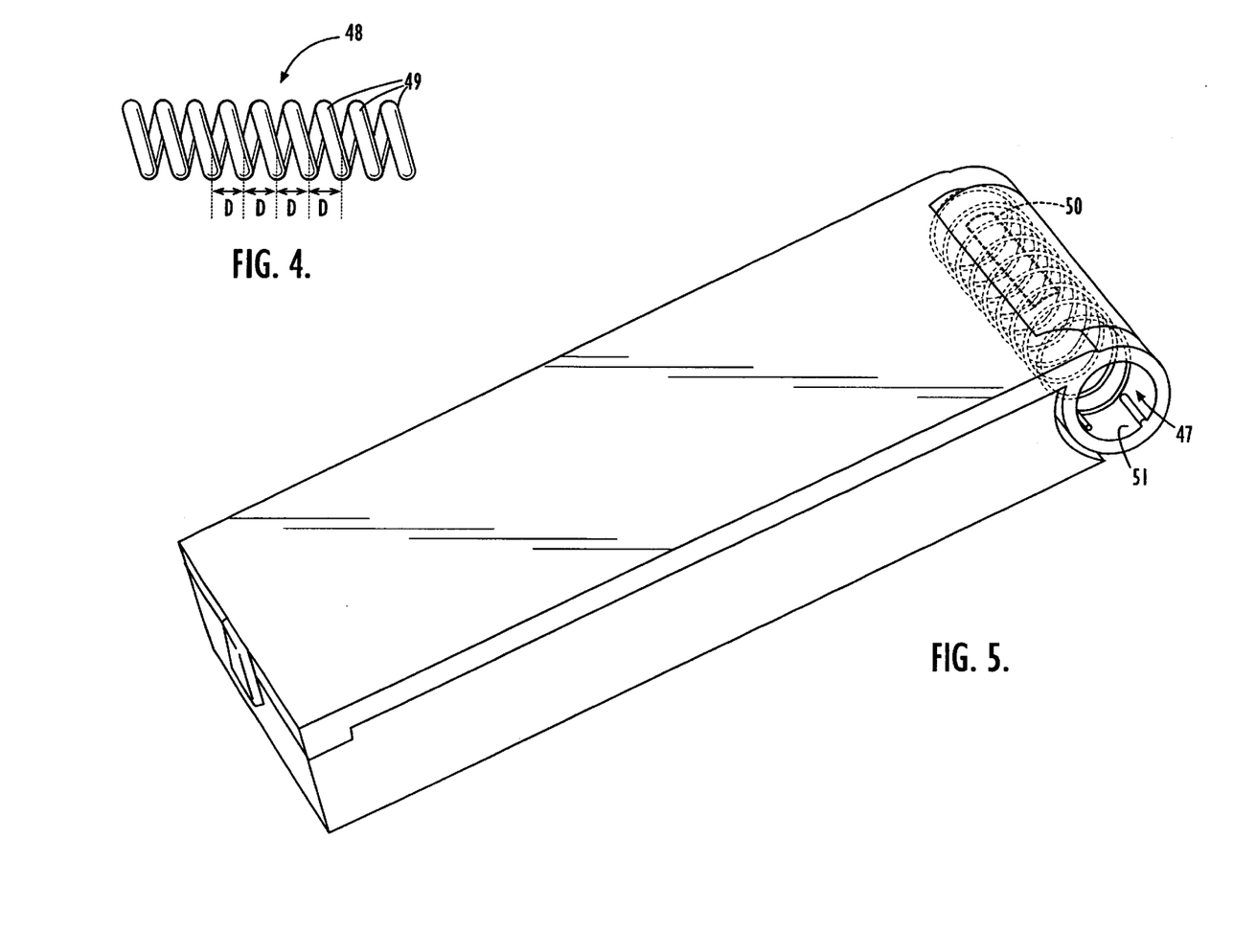
FIG. 4 illustrates an internal spring member according to the present invention having substantially uniform pitch between adjacent coils.
FIG. 5 illustrates a radiotelephone incorporating an electrically conductive, internal spring member according to the present invention wherein a conductive element is parasitically coupled with the spring member to provide multiple frequency band operation.

Referring now to FIG. 4, the pitch D between adjacent coils 49 of the spring member 48 is substantially uniform. As known to those skilled in this art, the term "pitch" refers to the repetitive distance between adjacent coils of a helical spring. Uniform pitch allows the spring member 48 to operate within a single frequency band throughout the predetermined path of rotation of the flip cover.

Referring now to FIG. 5, a radiotelephone 40 incorporating the electrically conductive spring member 48 illustrated in FIGS. 3A–3B is configured for dual frequency band ("dual-band") radiotelephone operation. Dual-band radiotelephones can transmit and receive radiotelephone signals in two or more separated frequency bands. Exemplary dual-band radiotelephones are those used with various satellite communications systems that employ widely separated transmit and receive frequency bands (e.g., 800 MHz and 1900 MHz).

In the illustrated embodiment, a conductive element 50 is disposed on the surface 51 of the hinge internal chamber 47. The conductive element 50 is parasitically coupled with the spring member 48 such that the spring member 48 and conductive element 50 operate within respective first and second frequency bands throughout the predetermined path of rotation of the flip cover 44. Alternatively, the conductive element 50 may be molded directly into the dielectric material of the hinge 46, as would be understood by those skilled in this art.

As is known to those skilled in this art, the spring member 48 and the conductive element 50 can jointly resonate within different respective frequency bands. For example, the spring member 48 can be tuned to resonate at 800 MHz with the conductive member 50. The combination of the spring member 48 and conductive member 50 can be tuned to resonate at 1900 MHz. Together, the spring member 48 and the conductive element 50 can enable multiple frequency band radiotelephone operation.

In the illustrated embodiment, the conductive element 50 is a rectangular-shaped strip maintained in adjacent, spaced-apart relationship with the spring member 48. However, it is understood that conductive elements having various shapes and configurations may be utilized to parasitically couple with the spring member 48 according to the present invention.

Figures 6, 7A:
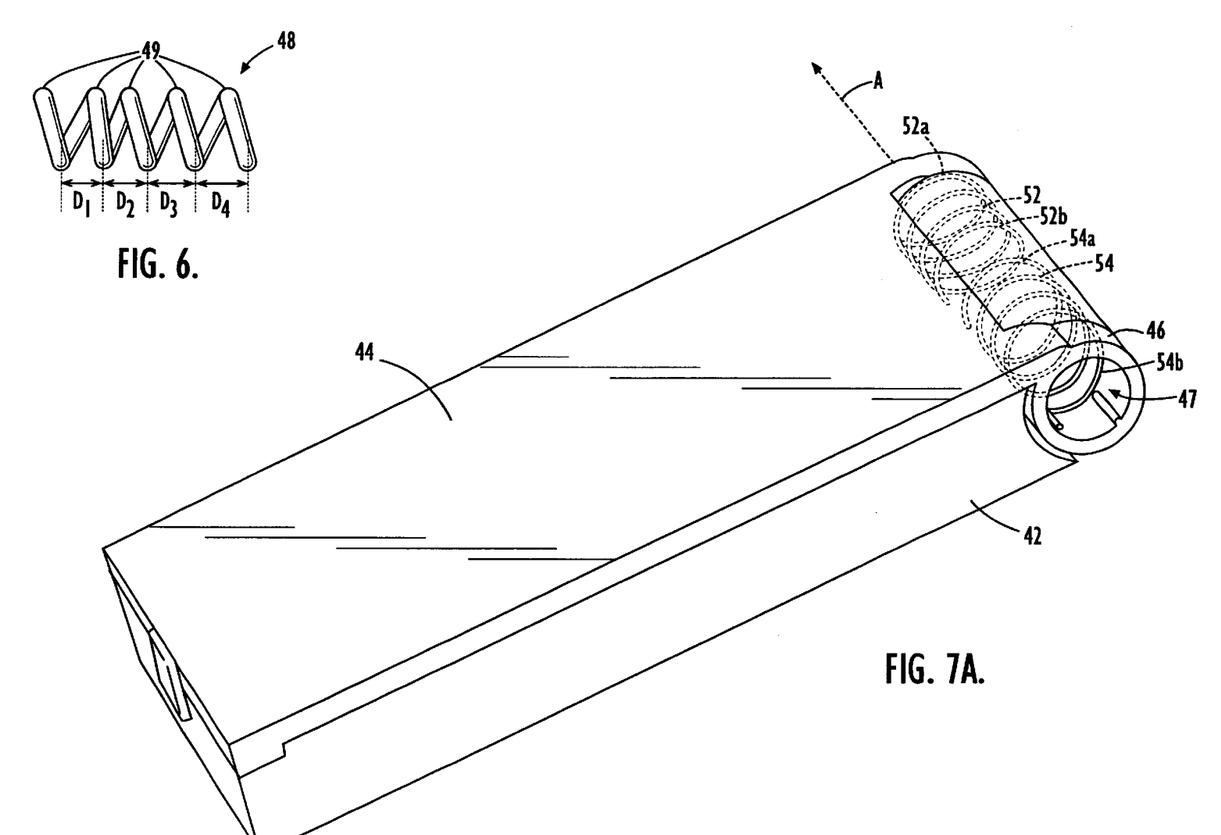
FIG. 6 illustrates a spring member according to the present invention having substantially non-uniform pitch between adjacent coils such that the spring member can operate within multiple frequency bands.
FIG. 7A illustrates a radiotelephone having a pair of electrically conductive, internal spring members for facilitating dual-band radiotelephone operation according to an embodiment of the present invention.

According to another embodiment of the present invention, physical characteristics of the spring member 48 can be modified to effect operating frequency bands. For example, the pitch between adjacent coils 49 of the spring member 48 can be substantially non-uniform. This is illustrated in FIG. 6 by D1, D2, D3, and D4. Non-uniform pitch can allow the spring member 48 to operate within multiple frequency bands throughout the predetermined path of rotation of a flip cover.

According to another embodiment of the present invention, a pair of spring members 52, 54 disposed within the internal chamber 47 of a flip cover hinge 46 may be utilized to facilitate dual-band radiotelephone operation, as illustrated in FIG. 7A. Either or both of the spring members 52, 54 are configured to exert a biasing force on the flip cover 44 to urge the flip cover 44 to an open position.

The illustrated spring members 52, 54 each have helically coiled configurations that define respective axes that are generally parallel with the illustrated axis A defined by the hinge internal chamber 47. The illustrated spring members 52, 54 each have respective opposite end portions 52a, 52b and 54a, 54b. In the illustrated embodiment, the spring members 52, 54 are in an adjacent, end-to-end relationship with each other. End portion 52b of spring member 52 is aligned with end portion 54a of spring member 54.

The spring members 52, 54 are in electrical communication with a transceiver disposed within the radiotelephone housing 42 and are configured to operate within respective first and second frequency bands throughout the predetermined path of rotation of the flip cover 44 to transmit and receive radiotelephone communication signals.

The spring members 52, 54 are not limited to the illustrated configuration and arrangement within the hinge internal chamber 47. Various configurations and arrangements may be utilized without departing from the spirit and intent of the present invention. For example, the spring members 52, 54 may be concentrically arranged with each other as illustrated in FIG. 7B.

Figures 7B, 8A:
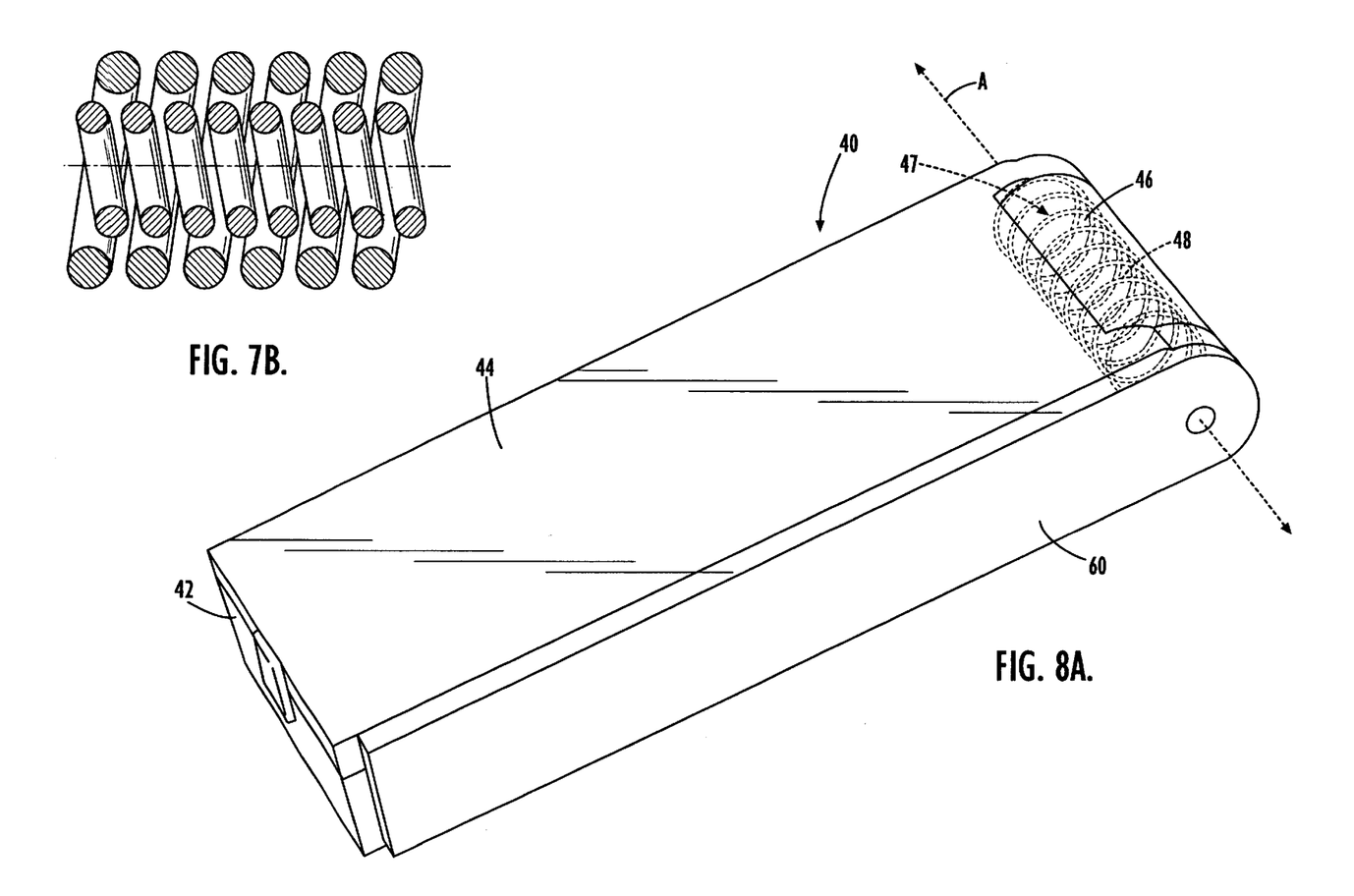
FIG. 7B is a cross-sectional, side view of a pair of internal spring members concentrically arranged with respect to each other according to an embodiment of the present invention.
FIG. 8A illustrates a radiotelephone incorporating an electrically conductive, internal spring member according to the present invention and having a flip cover and a pivotally mounted antenna in closed and stored positions, respectively.
Figure 8B:
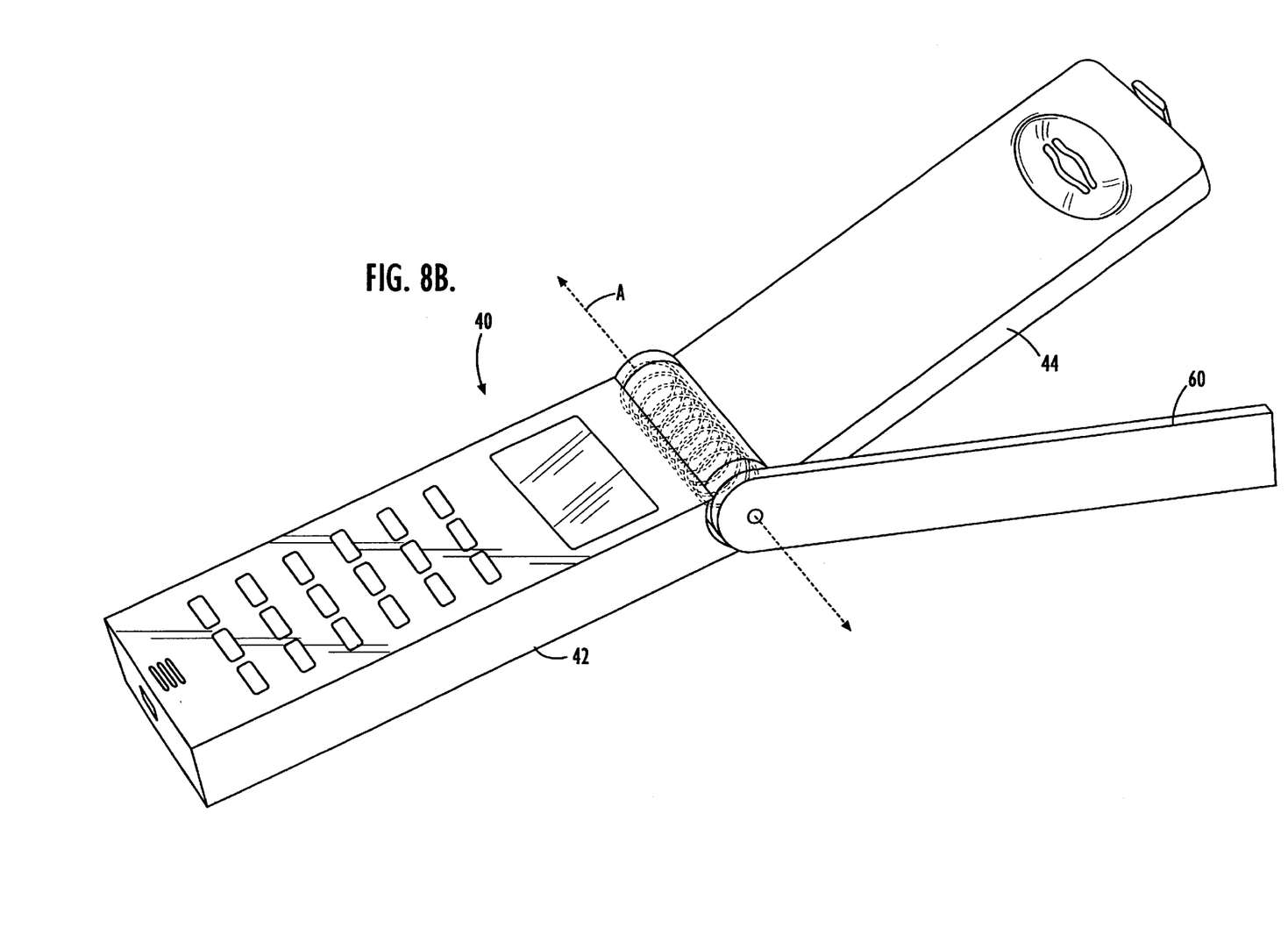
FIG. 8B illustrates the radiotelephone of FIG. 8A with the flip cover and pivotally mounted antenna in open and operating positions, respectively.

Referring now to FIGS. 8A–8B, a radiotelephone 40 according to another embodiment of the present invention is illustrated. The illustrated radiotelephone 40 includes a housing 42, a flip cover 44 rotatably secured to the housing 42 via hinge 46 as described above, and an antenna 60 secured to the hinge and rotatable therewith about an axis A and along a predetermined path from a stored position (FIG. 8A) adjacent the housing 42 to an operating position (FIG. 8B) extending away from the housing 42. An electrically conductive spring member 48 for urging the flip cover 44 and the antenna 60 to respective operating positions (FIG. 8B) is disposed within the hinge internal chamber 47, as described above.

The spring member 48 is in electrical communication with the antenna 60 and the transceiver within the radiotelephone housing 42. The spring member 48 may be directly connected with the antenna 60. Alternatively, the spring member 48 may be capacitively coupled with the antenna 60 as illustrated schematically in FIG. 9. Capacitively coupled radiotelephone antennas are described in Applicant's pending U.S. patent application, Ser. No. 09/136,007, filed Aug. 17, 1998, and which is incorporated herein by reference in its entirety.

Figure 9:
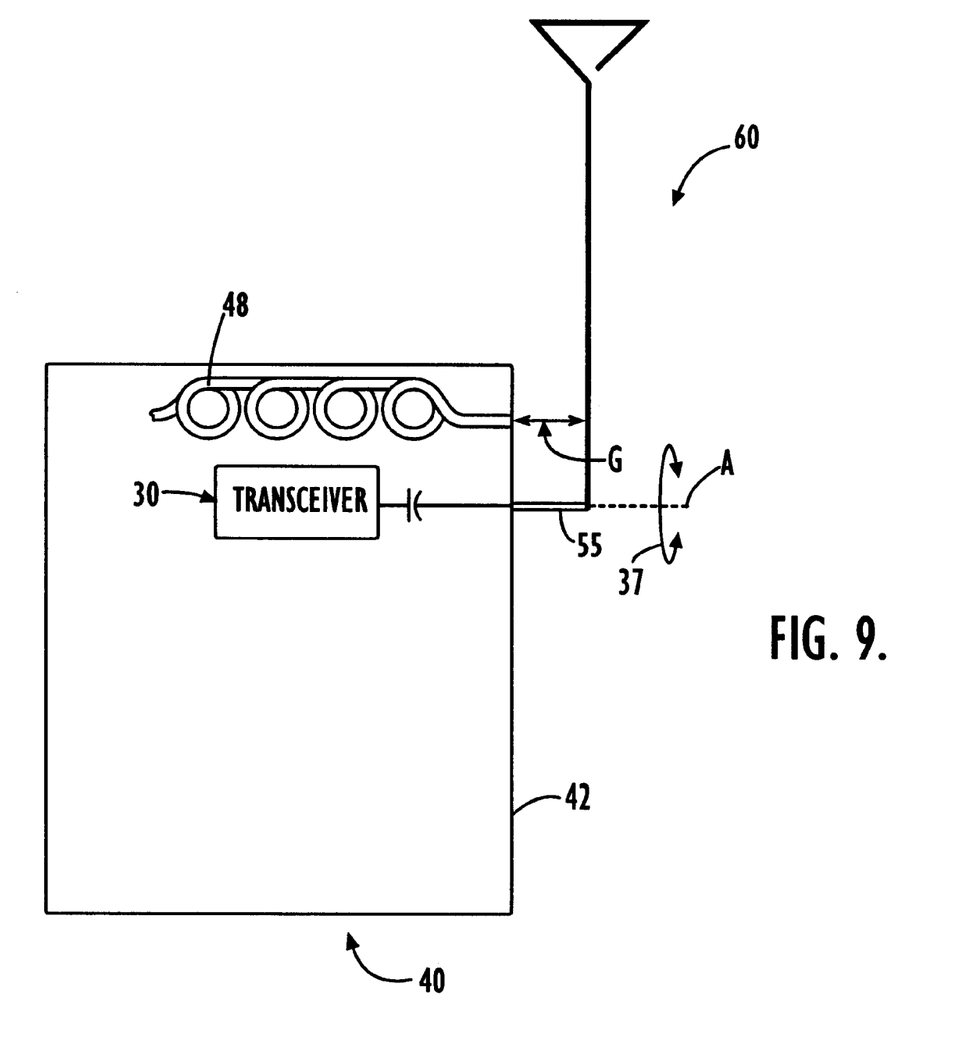
FIG. 9 schematically illustrates an electrically conductive, internal spring member according to the present invention capacitively coupled with an antenna pivotally mounted to a radiotelephone housing.

Referring to FIG. 9 the antenna 60 of FIGS. 8A, 8B is schematically illustrated. The antenna 60 is pivotally mounted to the housing 42 of a radiotelephone 40 or other electronic device via a pin 55 or other mechanical device that facilitates rotation. The antenna 60 rotates about the axis A along a predetermined path as indicated by the arrow 37. The antenna 60 is electrically coupled to the transceiver 30 within the electronic device housing 42. The antenna 60 is not directly connected to the electrically conductive spring member 48. Instead, the antenna 60 is maintained in a spaced-apart relationship with the spring member 48 (indicated by gap G) throughout the predetermined path of rotation. As is understood by those skilled in the art, the gap G creates a capacitance between the antenna 60 and the spring member 48 that electrically couples the antenna 60 and the spring member 48 together.

Preferably, the antenna 60 is electrically disconnected from the transceiver when the antenna 60 is in the stored position. Accordingly, the spring member 48 operates as a quarter-wave (or multiples thereof) antenna when the antenna is in the stored position. The spring member 48 and the antenna 60 preferably operate together as a half-wave (or multiples thereof) antenna when the antenna 60 is in the operating position.

Figure 10:
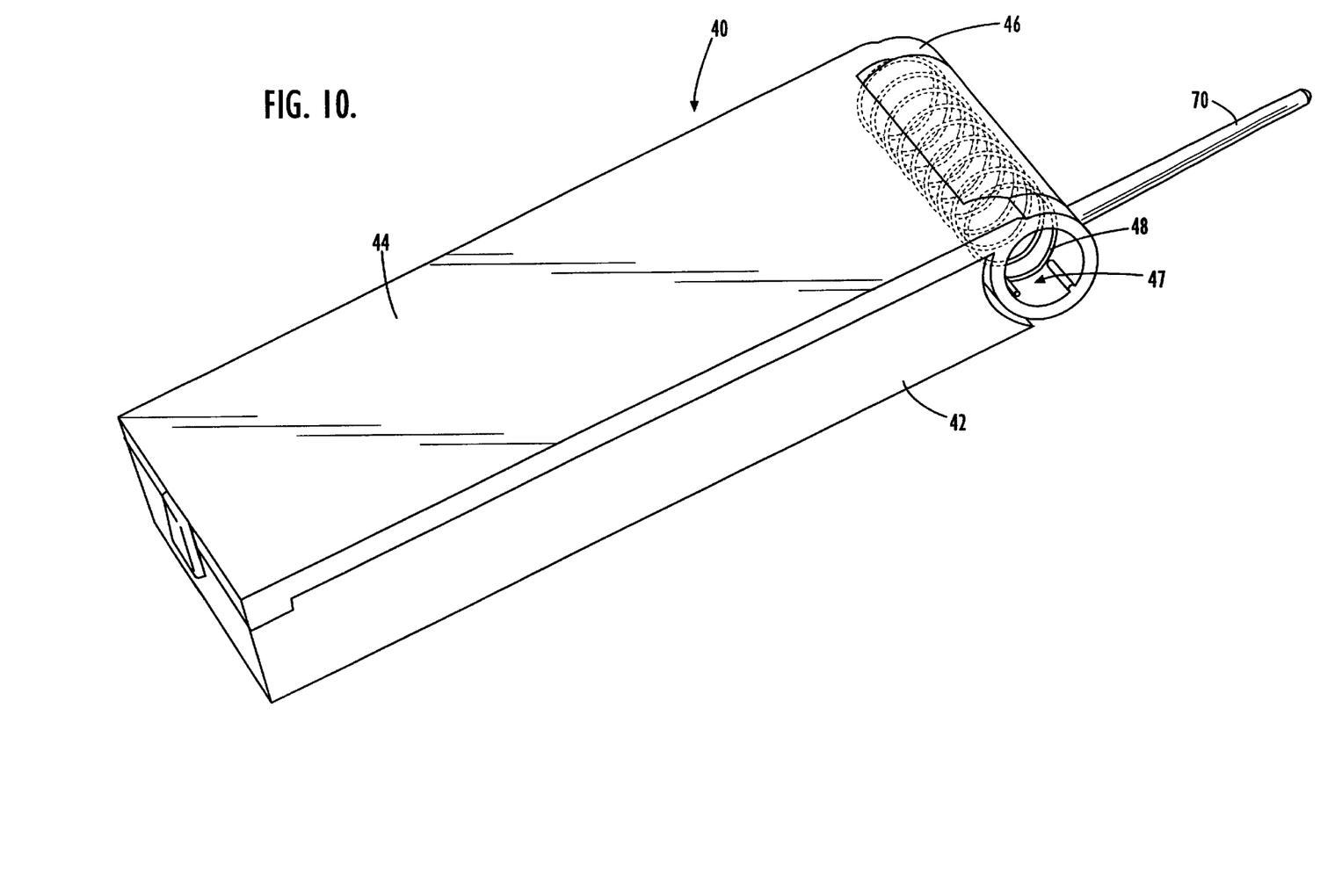
FIG. 10 illustrates a radiotelephone incorporating an electrically conductive spring member according to the present invention and having a stationary antenna extending from the housing thereof.

According to another embodiment of the present invention illustrated in FIG. 10, a spring member 48 for urging a flip cover 44 or other appendage of an electronic device may be utilized with a stationary or retractable radiotelephone antenna 70. The illustrated radiotelephone 40 includes a housing 42, a flip cover 44 rotatably secured to the housing 42 via hinge 46 as described above, and an antenna 70 extending from the housing 42.

An electrically conductive spring member 48 for urging the flip cover 44 to an operating position is disposed within the hinge internal chamber 47, as described above. The spring member 48 is in electrical communication with the antenna 70 and the transceiver. The spring member 48 may be directly connected with the antenna 70. Alternatively, the spring member 48 may be capacitively coupled with the antenna 70 as described above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An antenna system for an electronic device, wherein the electronic device includes a housing, and wherein the housing is configured to enclose a receiver that receives wireless communication signals, the antenna system comprising:
    a hinge rotatably fixed to the housing;
    an appendage secured to the hinge and rotatable therewith about a first axis and along a predetermined path of rotation from a closed position adjacent the housing to an open position extending away from the housing; and
    first and second electrically conductive spring members disposed within the hinge, wherein at least one of the first and second spring members is configured to exert a biasing force on the appendage to urge the appendage to the open position, wherein the first and second spring members each have opposite end portions, wherein the first and second spring members are in electrical communication with the receiver, and wherein the first and second spring members are configured to operate within respective first and second frequency bands throughout the predetermined path of rotation of the appendage to receive wireless communication signals.

2. An antenna system according to claim 1 further comprising at least one antenna secured to the hinge and rotatable therewith about the first axis and along a predetermined path of rotation from a stored position adjacent the housing to an operating position extending away from the housing, wherein the at least one antenna is in electrical communication with the receiver.

3. An antenna system according to claim 2 wherein the at least one antenna comprises a plurality of antennas.

4. An antenna system according to claim 1 wherein the first spring member is configured to deflect under torsion as the appendage is moved from the closed position to the open position, such that an impedance of the first spring member matches an impedance of the receiver when the appendage is in both the closed and open operating positions.

5. An antenna system according to claim 1 wherein the second spring member is configured to deflect under torsion as the appendage is moved from the closed position to the open position, such that an impedance of the second spring member matches an impedance of the receiver when the appendage is in both the closed and open operating positions.

6. An antenna system according to claim 1 wherein the first spring member has a helically coiled configuration that defines a second axis, and wherein the second axis is generally parallel with the first axis.

7. An antenna system according to claim 1 wherein the second spring member has a helically coiled configuration that defines a third axis, and wherein the third axis is generally parallel with the first axis.

8. An antenna system according to claim 1 wherein the helically coiled configuration of the first spring member is concentric with the helically coiled configuration of the second spring member.

9. An antenna system according to claim 1 wherein an end portion of the first spring member is in an adjacent, end-to-end relationship with an end portion of the second spring member.

10. An antenna system according to claim 1 wherein the hinge is formed from dielectric material having a dielectric constant of between about 2.0 and about 5.0.

11. An antenna system according to claim 1 wherein the first and second spring members each operates separately as a quarter-wave antenna.

12. An antenna system according to claim 1 wherein the first and second spring members operate together as a half-wave antenna.

13. An antenna system according to claim 1 wherein the electronic device is a radiotelephone.

14. An antenna system according to claim 1 wherein the appendage is a flip cover.

15. An antenna system for an electronic device, wherein the electronic device includes a housing, and wherein the housing is configured to enclose a receiver that receives wireless communication signals, the antenna system comprising:
- a hinge rotatably fixed to the housing;
- an appendage secured to the hinge and rotatable therewith about a first axis and along a predetermined path of rotation from a closed position adjacent the housing to an open position extending away from the housing;
- an antenna extending from the housing, wherein the antenna is in electrical communication with the receiver and is configured to receive wireless communications signals; and
- an electrically conductive spring member disposed within the hinge, wherein the spring member is configured to exert a biasing force on the appendage to urge the appendage to the open position, wherein the spring member is in electrical communication with the antenna and the receiver, and wherein the spring member is configured to receive wireless communication signals.

16. An antenna system according to claim 15 wherein the spring member is configured to deflect under torsion as the appendage is moved from the closed position to the open position, such that a combined impedance of the spring member and antenna matches an impedance of the receiver when the appendage is in both the closed and open operating positions.

17. An antenna system according to claim 15 wherein the spring member has a helically coiled configuration that defines a second axis, and wherein the second axis is generally parallel with the first axis.

18. An antenna system according to claim 15 wherein the hinge is formed from dielectric material having a dielectric constant of between about 2.0 and about 5.0.

19. An antenna system according to claim 15 wherein the spring member and antenna operate together as a half-wave antenna.

20. An antenna system according to claim 15 wherein the spring member operates as a quarter-wave antenna.

21. An antenna system according to claim 15 wherein the electronic device is a radiotelephone.

22. An antenna system according to claim 15 wherein the appendage is a flip cover.

23. An antenna system for an electronic device, wherein the electronic device includes a housing, and wherein the housing is configured to enclose a receiver that receives wireless communication signals, the antenna system comprising:
- a hinge rotatably fixed to the housing;
- an antenna secured to the hinge and rotatable therewith about a first axis and along a predetermined path of rotation from a stored position adjacent the housing to an operating position extending away from the housing, wherein the antenna is in electrical communication with the receiver and is configured to receive wireless communications signals; and
- an electrically conductive spring member disposed within the hinge, wherein the spring member is configured to exert a biasing force on the antenna to urge the antenna to the operating position, wherein the spring member is in electrical communication with the antenna and the receiver, and wherein the spring member is configured to receive wireless communication signals.

24. An antenna system according to claim 23 wherein the spring member is configured to deflect under torsion as the antenna is moved from the stored position to the operating position, such that an impedance of the spring member and antenna matches an impedance of the receiver when the antenna is in both the closed and open operating positions.

25. An antenna system according to claim 23 wherein the spring member and antenna maintain a substantially constant spaced-apart relationship therebetween throughout the predetermined path of rotation so as to be capacitively coupled.

26. An antenna system according to claim 23 wherein the spring member has a helically coiled configuration that defines a second axis, and wherein the second axis is generally parallel with the first axis.

27. An antenna system according to claim 23 further comprising means for electrically disconnecting the antenna from the receiver when the antenna is in the stored position.

28. An antenna system according to claim 23 wherein the hinge is formed from dielectric material having a dielectric constant of between about 2.0 and about 5.0.

29. An antenna system according to claim 23 wherein the spring member and antenna operate together as a half-wave antenna.

30. An antenna system according to claim 23 wherein the spring member operates as a quarter-wave antenna.

31. An antenna system according to claim 23 wherein the electronic device is a radiotelephone.

32. An antenna system for an electronic device, wherein the electronic device includes a housing, and wherein the housing is configured to enclose a receiver that receives wireless communication signals, the antenna system comprising:

a hinge rotatably fixed to the housing;

an appendage secured to the hinge and rotatable therewith about a first axis and along a predetermined path of rotation from a closed position adjacent the housing to an open position extending away from the housing; and an electrically conductive spring member disposed within the hinge, wherein the spring member is configured to exert a biasing force on the appendage to urge the appendage to the open position, wherein the spring member is in electrical communication with the receiver, and wherein the spring member is configured to receive wireless communication signals.

33. An antenna system according to claim 32 further comprising at least one antenna secured to the hinge and rotatable therewith about the first axis and along a predetermined path of rotation from a stored position adjacent the housing to an operating position extending away from the housing, wherein the at least one antenna is in electrical communication with the receiver.

34. An antenna system according to claim 33 wherein the spring member and the at least one antenna operate together as a half-wave antenna.

35. An antenna system according to claim 33 wherein the at least one antenna comprises a plurality of antennas.

36. An antenna system according to claim 32 further comprising a conductive element disposed within the hinge and parasitically coupled with the spring member such that the spring member and conductive element operate within respective first and second frequency bands throughout the predetermined path of rotation of the appendage.

37. An antenna system according to claim 32 wherein the spring member is configured to deflect under torsion as the appendage is moved from the closed position to the open position, such that an impedance of the spring member matches an impedance of the receiver when the appendage is in both the closed and open operating positions.

38. An antenna system according to claim 32 wherein the spring member has a helically coiled configuration that defines a second axis, and wherein the second axis is generally parallel with the first axis.

39. An antenna system according to claim 38 wherein pitch between adjacent coils of the spring member is substantially uniform such that the spring member operates within a single frequency band throughout the predetermined path of rotation of the appendage.

40. An antenna system according to claim 38 wherein pitch between adjacent coils of the spring member is substantially non-uniform such that the spring member operates within multiple frequency bands throughout the predetermined path of rotation of the appendage.

41. An antenna system according to claim 32 wherein the hinge is formed from dielectric material having a dielectric constant of between about 2.0 and about 5.0.

42. An antenna system according to claim 32 wherein the spring member operates as a quarter-wave antenna.

43. An antenna system according to claim 32 wherein the electronic device is a radiotelephone.

44. An antenna system according to claim 32 wherein the appendage is a flip cover.

45. A radiotelephone, comprising:

a housing configured to enclose a transceiver that transmits and receives radiotelephone communications signals;

a hinge rotatably fixed to the housing;

a flip cover secured to the hinge and rotatable therewith about a first axis and along a predetermined path of rotation from a closed position adjacent the housing to an open position extending away from the housing; and an electrically conductive spring member disposed within the hinge, wherein the spring member is configured to exert a biasing force on the flip cover to urge the flip cover to the open position, wherein the spring member is in electrical communication with the transceiver, and wherein the spring member is configured to receive wireless communication signals.

46. A radiotelephone according to claim 45 further comprising at least one antenna secured to the hinge and rotatable therewith about the first axis and along a predetermined path of rotation from a stored position adjacent the housing to an operating position extending away from the housing, wherein the at least one antenna is in electrical communication with the transceiver.

47. A radiotelephone according to claim 46 wherein the hinge is formed from dielectric material having a dielectric constant of between about 2.0 and about 5.0.

48. A radiotelephone according to claim 46 wherein the spring member and the at least one antenna operate together as a half-wave antenna.

49. A radiotelephone according to claim 46 wherein the at least one antenna comprises a plurality of antennas.

50. A radiotelephone according to claim 45 wherein the spring member is configured to deflect under torsion as the flip cover is moved from the closed position to the open position, such that an impedance of the spring member matches an impedance of the transceiver when the flip cover is in both the closed and open operating positions.

51. A radiotelephone according to claim 45 further comprising a conductive element disposed within the hinge and parasitically coupled with the spring member such that the spring member and conductive element operate within respective first and second frequency bands throughout the predetermined path of rotation of the flip cover.

52. A radiotelephone according to claim 51 wherein the spring member and conductive element operate together as a half-wave antenna.

53. A radiotelephone according to claim 45 wherein the spring member has a helically coiled configuration that defines a second axis, and wherein the second axis is generally parallel with the first axis.

54. A radiotelephone according to claim 53 wherein pitch between adjacent coils of the spring member is substantially uniform such that the spring member operates within a single frequency band throughout the predetermined path of rotation of the flip cover.

55. A radiotelephone according to claim 53 wherein pitch between adjacent coils of the spring member is substantially non-uniform such that the spring member operates within multiple frequency bands throughout the predetermined path of rotation of the flip cover.

56. A radiotelephone according to claim 45 wherein the spring member operates as a quarter-wave antenna.

* * * * *